United States Patent [19]

Kim

[11] Patent Number: 5,052,668
[45] Date of Patent: Oct. 1, 1991

[54] AUTOMATIC PAPER SUPPLYING AND FEEDING MECHANISM IN A VIDEO PRINTER

[75] Inventor: Wan-Ha Kim, Suwon, Rep. of Korea

[73] Assignee: SamSung Electronics Co., Ltd., Suwon, Rep. of Korea

[21] Appl. No.: 582,381

[22] Filed: Sep. 14, 1990

[30] Foreign Application Priority Data

Nov. 30, 1989 [KP] D.P.R. of Korea .................... 17661

[51] Int. Cl.$^5$ ............................................. B65H 5/02
[52] U.S. Cl. ........................................ 271/3; 271/122; 271/176; 271/258; 271/902
[58] Field of Search .................... 271/3, 122, 902, 225, 271/258, 176

[56] References Cited

U.S. PATENT DOCUMENTS 4,033,575  7/1977  Fujimoto ............................... 271/3
4,679,953  7/1987  Sone ................................ 271/902 X Primary Examiner—Richard A. Schacher
Attorney, Agent, or Firm—Robert E. Bushnell

[57] ABSTRACT

A video printer of the present invention is characterized by a holder attached to the drum for securely holding the printing paper thereon, so that the paper could be closely fixed onto the drum surface to be exactly transported through the entire printing processes up to even its final feeding step without any printing error, thereby obtaining a clear color image of printing in a video printer.

1 Claim, 4 Drawing Sheets

AUTOMATIC PAPER SUPPLYING AND FEEDING MECHANISM IN A VIDEO PRINTER

BACKGROUND OF THE INVENTION

The present invention relates to a video printer, and particularly an automatic paper supplying and feeding mechanism used therein.

Generally, a video printer, often referred to as a color printer, is constructed with a three-color ribbon, a drum, a head and an automatic paper supplying device. Such a conventional video printer often has a serious drawback that it can hardly provide a clear printing image. The drawback mostly results from the paper sliding phenomena often occurring in a contacting region between the drum and the head. Namely, when paper passes for printing a gap between the drum and the head, by rotation of the drum, the frictional resistance of the head against the paper causes the paper to slip on the drum, so that a preceding print image may be confused with its subsequent print image, which frequently causes a printing error. This partly results from the fact that, when printing, the paper is not closely fixed onto the drum surface and an automatic feeding of the paper is not carried out effectively.

SUMMARY OF THE INVENTION

It is therefore an object of the present invention to provide an automatic paper supplying and feeding mechanism in a video printer to prevent such occurrence of sliding phenomena of the paper for printing on the drum surface.

A video printer of the present invention is characterized by a holder attached to the drum for securely holding the printing paper thereon, so that the paper could be closely fixed onto the drum surface to be exactly transported through the entire printing processes up to even its final feeding step without any printing error, thereby obtaining a clear color image of printing in a video printer.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF A PREFERRED EMBODIMENT

Figure 1:
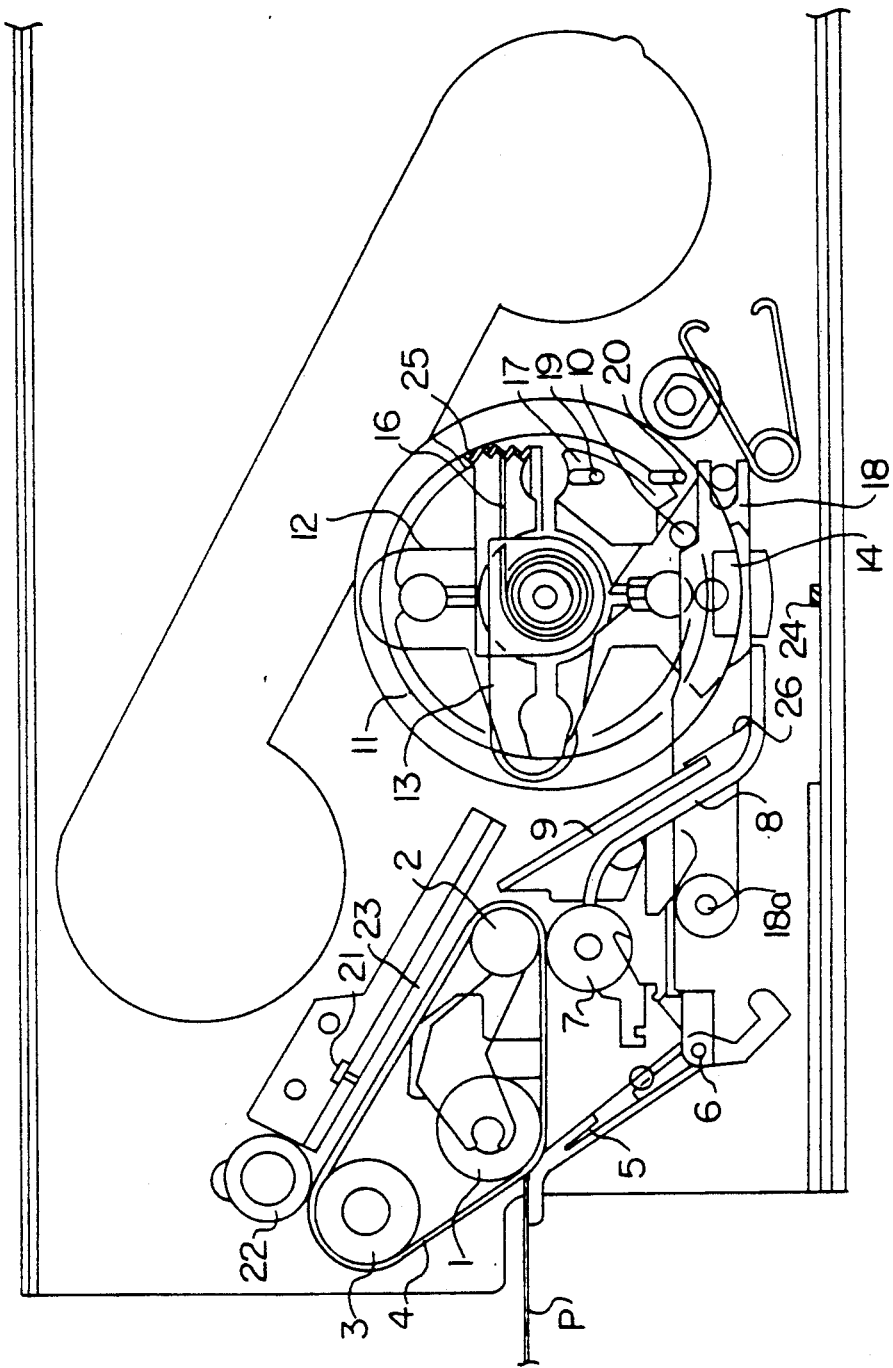
FIG. 1 is a schematic view of internal structure of a video printer according to the present invention.

Referring to FIG. 1, there is mounted in the region near the printing paper inlet opening a triangular-shaped roll mechanism comprising a paper supplying roll 1, a position fixing roll 2 arranged horizontally inside to the paper supplying roll 1, and an intermediate roll 3 upwardly outside the paper supplying roll. Around the roll mechanism is mounted an endless belt 4 moving counter-clockwise by means of the driving force of the paper supplying roll 1. The upper end portion of a lift lever 5 abuts the portion of the endless belt 4 adjacent to the paper supplying roll 1, and the lower portion of the lift lever 5 is supported on a pivot 6 about which the lift lever 5 pivots to lift the printing paper to guide between the upper end portion and the paper supplying roll 1.

Beneath the position fixing roll 2 is mounted a reverse rotation roll 7 for preventing excess supplying of papers more than one sheet, adjacent to the inner side of which are there mounted a stopping plate 9 for preventing upward deflection of the printing paper directed towards the drum and a guide plate 8 with a PVC seat 26 for preventing up/down fluctuation of the printing paper in the interval between the lower end of the stopping plate and the lowest portion of the drum 11. The lower end portion of the guide plate 8 is horizontally extended adjacent to the drum 11 so as to facilitate the printing paper closely contact the drum 11. Two brackets 12 and 13 are mounted on the drum 11. One 12 of the brackets has a paper holder 14 to reciprocate vertically together with the bracket 12 so as to pick up and release the supplied printing paper during the rotation of the drum 11.

A pin 10 is projected on the lower end of the other bracket 13 tending to rotate leftwise about the center of the drum 11, which tendency is caused by a torsion spring 16, whose coil portion is mounted around the shaft of the drum 11. This bracket 13 pivots in the direction reverse to that of the drum 11. A third bracket 17 vertically reciprocates to fix the position a transfer bracket 18 during paper supplying when the transfer bracket 18 is pivoted. The third bracket 17 has a pair of elongated guide slots 20 each received by a fixed pin 19 to guide itself. Over the position fixing roll 2 and the intermediate roll 3 is mounted a discharging sensor 21 with a paper discharging passage 23 interposed therebetween. A paper discharging roll 22 is mounted to contact the portion of the belt 4 abutting the intermediate roll 3, so that it is rotated by the rotational force of the belt 4 so as to quickly and surely discharge the printed paper.

In the structure of the above described video printer, the essential point of the present invention consists in the paper holding and discharging system comprising the guide plate 8, the holder 14, the bracket 12 for mounting the holder 14, the discharge sensor 21 and the paper discharging roll 22. Hereinafter will now be described the operation of the inventive video printer.

First, the paper supplying is described with reference to FIG. 1. The printing paper P is supplied towards the drum 11 by the frictional force of the belt 4 with the leading end thereof lifted up by the lift lever 5. The belt 4 moves counter-clockwise. The reverse rotation roll 7 is rotated in the direction opposite to the moving direction of the belt 4, so as to prevent excess supplying of the papers more than one sheet. Thereafter, the printing paper is continuously transferred along the passage between the transfer bracket 18 and the stopping plate. In this case, the guide plate 8 guides both side edges of the printing paper so as to prevent fluctuation of printing paper. Moreover, when the printing paper P is transferred along the moderately curved bottom surface of the transfer bracket 18 towards the drum 11, it does not bend upwards with the help of the PVC seat 26. Hence, the printing paper P is smoothly supplied to the drum 11 without being bent or misaligned.

Thereafter, when the leading end of the printing paper P approaches the holder 14, the sensor 24 senses the printing paper supplied and sends an electrical signal to a drive motor (not shown), so that the drum 11 begins to rotate counter-clockwise. At the same time, the bracket 13 is rotated in the same direction with the help of the torsion spring 16, and the other bracket 12 vertically rises together with the holder 14 that holds the leading end of the printing paper P.

Figure 2:
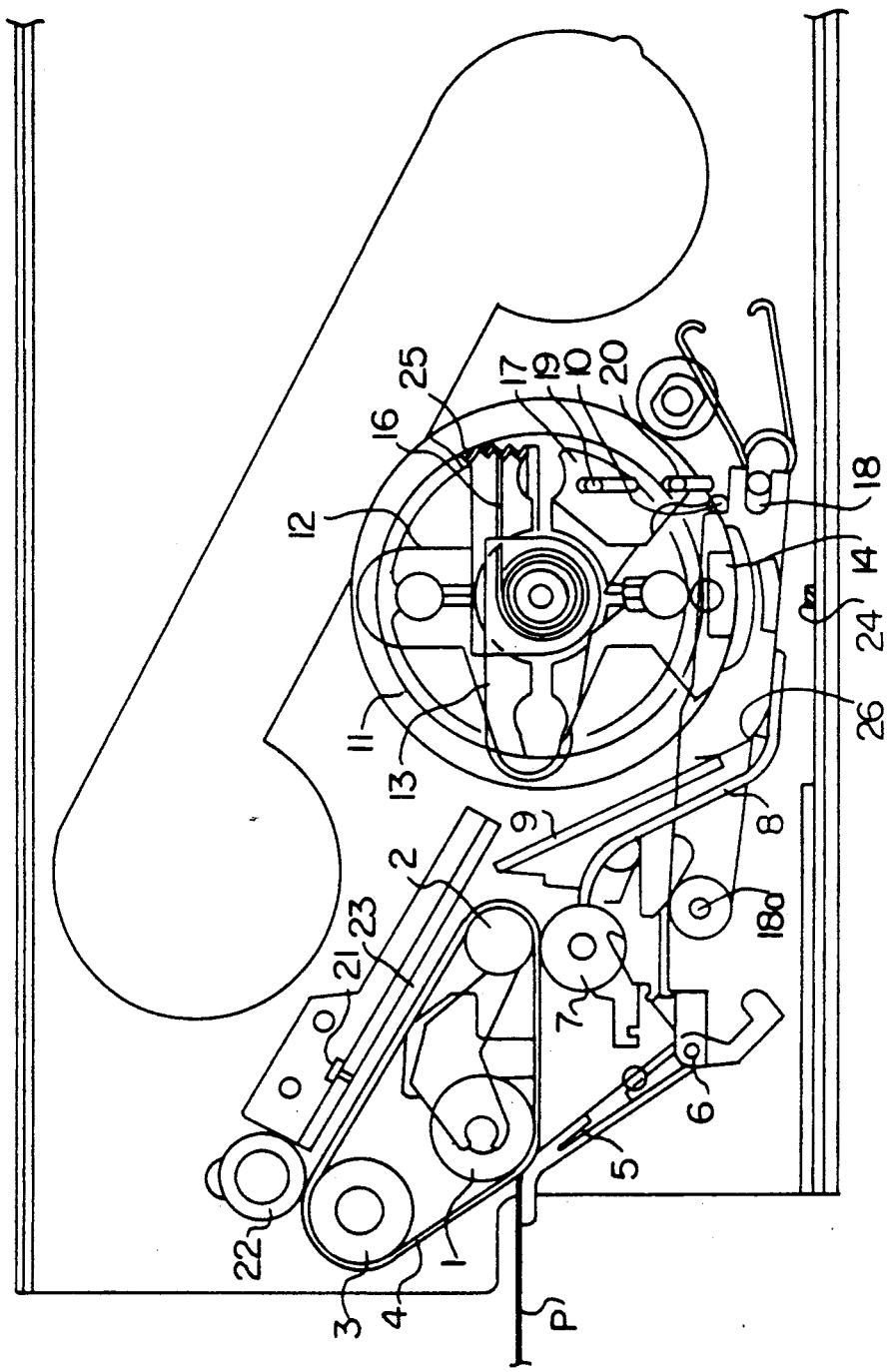
FIG. 2 is a view similar to FIG. 1 for illustrating its printing operation.

Next, the printing operation is described with reference to FIG. 2. When the pin 10 of the drum 11 rotating counter-clockwise approaches and contacts the transfer bracket 18, the transfer bracket 18 is pushed away counter-clockwise about shaft 18a, so that the holder 14 is not taken up by the bottom surface of the transfer bracket 18. Subsequently, when the pin 10 is more pivoted to the direction of about 5 o'clock, the other bracket 17 is pulled by tension spring 25, thus vertically rising while it picks up the transfer bracket 18 to the operating position. In this position, the drum rotates three times to complete the printing operation.

Figure 3:
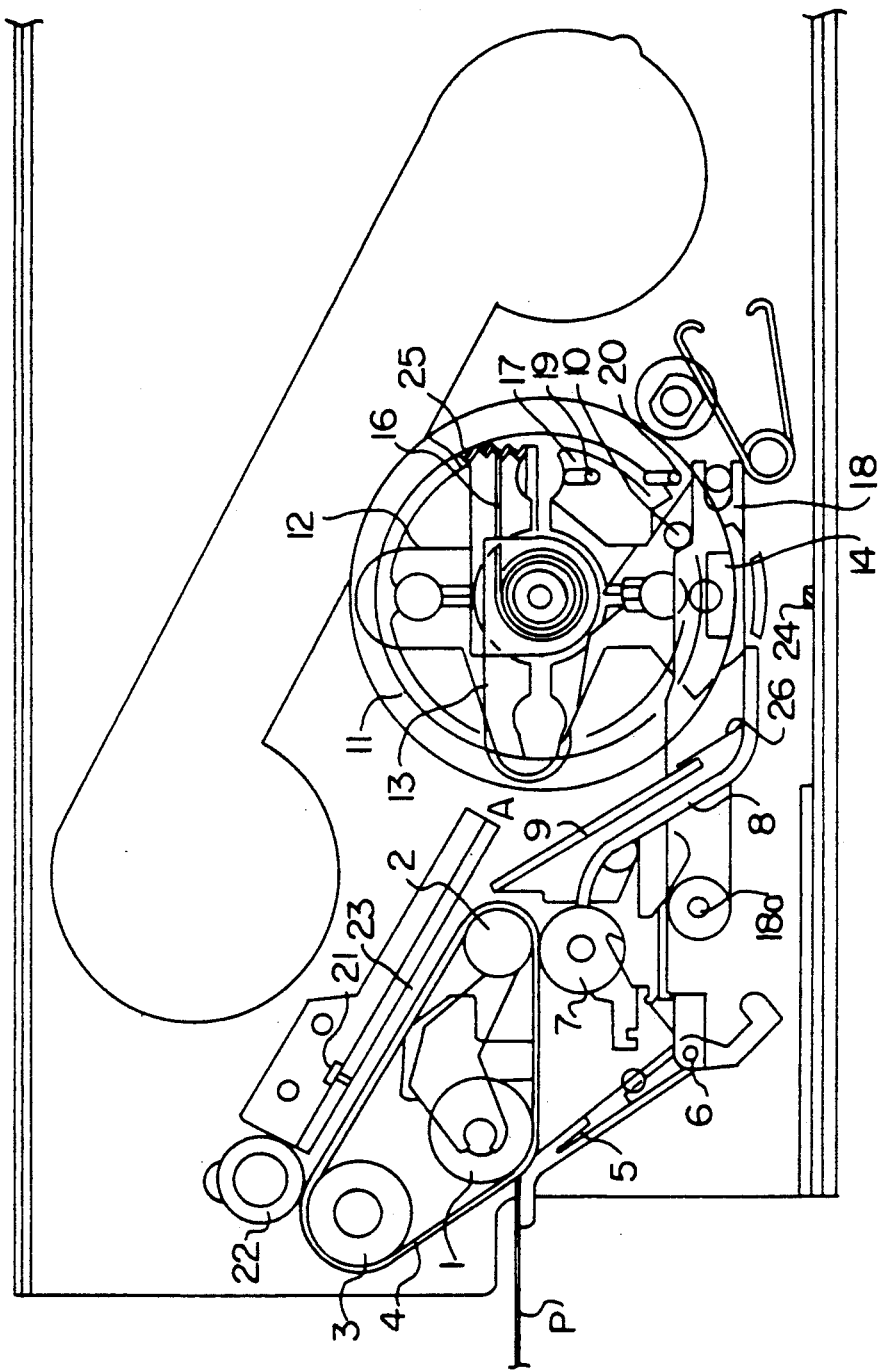
FIG. 3 is a view similar to FIG. 1 for illustrating its discharging operation.
Figure 4:
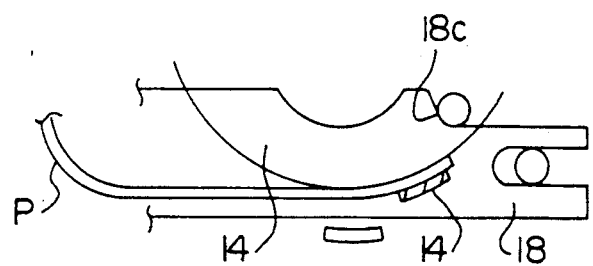
FIG. 4 is a schematic view for illustrating that a holder picks up and releases a printing paper.

Finally, the paper discharging operation is described with reference to FIG. 3. The printed paper P held by the drum 11 and holder 14 is moved to the position fixing roll 2 at the position of 9 o'clock from the rotational position of 11 o'clock. From this time, the trailing end of the printed paper P contacts the belt 4 at the beginning end of the paper discharging passage 23, thus easily transferred to the discharging roll 22 to finally discharge it. While being transferred, the printed paper P has its leading end continuously held by the holder 14. Then, as shown in FIG. 4, when the pin 10 collides with the end 18c of the transfer bracket 18 at position C, the bracket 13 is rotated clockwise and the other bracket 12 moves downwardly so as to cause the holder 14 to descend to position a, so that the printed paper P is released to be freely discharged outside the printer.

Thus, according to the inventive video printer, all the process from supplying the paper to printing to discharging is automatically performed, so that the paper supplying to the drum becomes stable, and the printing paper is closely fixed on the drum, smoothly guided to the discharging stage without any errors, thus providing a clear printed image.

While the invention has been particularly shown and described with reference to a preferred embodiment, it will be understood by those skilled in the art that modifications in detail may be made without departing from the spirit and scope of the invention.

What is claimed is:

1. An automatic paper supplying and feeding mechanism for use in a video printer comprising a paper supplying lift lever (5), a reverse rotation roll (7) for preventing excess supplying of papers more than one sheet, an electrodeposition drum (11), and a sensor (24) for detecting the signal indicating the completion of a paper supplying, said automatic paper supplying and feeding mechanism characterized in further comprising:

a guide plate (9) mounted between said reverse rotation roll (7) and the lower contacting surface of said drum (11) for guiding said papers, a vertically moving bracket (12) linked to said drum (11), a rotation bracket (13) linked to said drum, a paper holder (14) attached to the lower end of said vertically moving bracket, a feed bracket control pin (10) attached to said rotation bracket (13), a paper discharging passage (23) provided between a position fixing roll (2) and an intermediate roll (3) over a paper supplying belt (4), and and a paper discharging sensor (21) and a paper discharging roll (22) mounted in the outlet end of said paper discharging passage (23).

* * * * *

UNITED STATES PATENT AND TRADEMARK OFFICE
CERTIFICATE OF CORRECTION

PATENT NO.  :  U.S. 5,052,668          Page 1 of 2
DATED       :  1 October 1991
INVENTOR(S) :  Wan-Ha KIM It is certified that error appears in the above-identified patent and that said Letters Patent is hereby corrected as shown below:

ON THE TITLE PAGE:

Item [30] change "D.P.R. of Korea" to --Republic of Korea--.

IN THE CLAIMS

Claim 1, Column 4, Line 13, insert a comma after "printer";

Line 14, delete "(5)" and delete "(7)";

Line 16, delete "(11)" and delete "(24)";

Line 20, delete "(9)";

Line 21, delete "(7)";

Line 22, delete "(11)";

Line 23, delete "(12)";

Line 24, delete "(11)";

Line 25, delete "(13)";

Line 26, delete "(14)";

Line 28, delete "(10)";

Line 29, delete "(13)";

Line 30, delete "(23)".

UNITED STATES PATENT AND TRADEMARK OFFICE
CERTIFICATE OF CORRECTION

PATENT NO. : U.S. 5,052,668　　　　　　　　　　Page 2 of 2
DATED :　1 October 1991
INVENTOR(S) : Wan-Ha KIM It is certified that error appears in the above-identified patent and that said Letters Patent is hereby corrected as shown below:

<u>IN THE CLAIMS</u>

Column 4,　　Claim 1,　　Line 31,　delete "(2)" and delete "(3)";

Line 32,　delete "(4)";

Line 33,　delete "(21)";

Line 34,　delete "(22)";

Line 35,　delete "(23)".

Signed and Sealed this

Twelfth Day of January, 1993

*Attest:*

DOUGLAS B. COMER

*Attesting Officer*　　　*Acting Commissioner of Patents and Trademarks*